(12) United States Patent
Lee et al.

(10) Patent No.: US 8,743,720 B2
(45) Date of Patent: Jun. 3, 2014

(54) METHOD OF CHANNEL MANAGEMENT FOR MULTIPLE COMPONENT CARRIER IN MOBILE COMMUNICATION SYSTEM

(75) Inventors: Kyoung Seok Lee, Daejeon (KR); Jae Heung Kim, Daejeon (KR); Kook Jin Lee, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 230 days.

(21) Appl. No.: 13/208,471

(22) Filed: Aug. 12, 2011

(65) Prior Publication Data

US 2012/0039200 A1 Feb. 16, 2012

(30) Foreign Application Priority Data

Aug. 12, 2010 (KR) .................. 10-2010-0077880
Nov. 8, 2010 (KR) .................. 10-2010-0110649

(51) Int. Cl.

| G06F 11/00 | (2006.01) |
|---|---|
| H04W 76/00 | (2009.01) |
| H04W 76/06 | (2009.01) |
| H04W 76/04 | (2009.01) |
| H04W 72/04 | (2009.01) |
| H04W 72/00 | (2009.01) |

(52) U.S. Cl.
CPC .......... *H04W 76/068* (2013.01); *H04W 76/048* (2013.01); *H04W 72/04* (2013.01); *H04W 72/00* (2013.01)
USPC ........................................ 370/252

(58) Field of Classification Search
CPC ... H04W 76/068; H04W 72/04; H04W 72/00; H04W 76/048
USPC ........................................ 370/252
See application file for complete search history.

(56) References Cited

U.S. PATENT DOCUMENTS

| 8,270,988 B1 * | 9/2012 | Sarkar et al. ............... 455/452.1 |
| 2010/0130219 A1 * | 5/2010 | Cave et al. ................... 455/450 |

(Continued)

FOREIGN PATENT DOCUMENTS

KR   1020100127733   12/2010

OTHER PUBLICATIONS

NEC, 3GPP TSG-RAN WG2#68bis, R2-100328, Valancia, Spain, Jan. 18-22, 2010, carrier Aggregation Activation/Deactivation, entire document.*

(Continued)

*Primary Examiner* — Mark Rinehart
*Assistant Examiner* — Maharishi Khirodhar
(74) *Attorney, Agent, or Firm* — NSIP Law

(57) ABSTRACT

Disclosed are channel management methods in a multicarrier structure in a mobile communication system. Uplink (UL) and downlink (DL) channel management methods in a carrier aggregation environment are used as the channel management methods. In DL, a base station determines a component carrier (CC) of an unstable radio channel state, stops data retransmission by the CC, and notifies a terminal of retransmission stop. In UL, the base station determines a CC of an unstable radio channel state and instructs the terminal to stop data retransmission by the CC, and the terminal stops the data retransmission and initializes a retransmission buffer. Using the channel management methods in the mobile communication system employing the multicarrier structure, an increase in the number of unnecessary retransmissions is prevented, so that unnecessary retransmission and power consumption of the terminal can be reduced and the waste of radio resources and the degradation of base station performance due to unnecessary retransmission can be prevented.

6 Claims, 4 Drawing Sheets

(56) References Cited

U.S. PATENT DOCUMENTS

2010/0238880 A1    9/2010  Wu
2010/0304786 A1   12/2010  Ou
2011/0002281 A1    1/2011  Terry et al.
2011/0292894 A1*  12/2011  Wu ............................. 370/329

OTHER PUBLICATIONS

ETRI, 3GPP TSG-RAN WG2#68bis, R2-100148, Valancia, Spain, Jan. 18-22, 2010, Explicit carrier Activation/Deactivation, entire document.*

Huawei, 3GPP TSG-RAN WG1#56bis, R1-0915418, Seoul, Korea, Mar. 23-27, 2009, Considerations on carrier activation/deactivation for DC-HSUPA, entire document.*

3GPP TSG RAN WG2 Meeting #68, R2-100449, "Considerations on activation/deactivation of component carrier", Jan. 18-22, 2010, pp. 1-4.*

3GPP TSG RAN WG2 Meeting #68, R2-100148, "Explicit carrier activation/deactivation", Jan. 18-22, 2010, pp. 1-3.*

3GPP TSG RAN WG2 Meeting #68, R2-100328, "Carrier Aggregation Activation/Deactivation", Jan. 18-22, 2010, pp. 1-3.*

* cited by examiner

METHOD OF CHANNEL MANAGEMENT FOR MULTIPLE COMPONENT CARRIER IN MOBILE COMMUNICATION SYSTEM

CLAIM FOR PRIORITY

This application claims priority to Korean Patent Application No. 10-2010-0077880 filed on Aug. 12, 2010 and Korean Patent Application No. 10-2010-0110649 filed on Nov. 8, 2010 in the Korean Intellectual Property Office (KIPO), the entire contents of which are hereby incorporated by reference.

BACKGROUND

1. Technical Field

Example embodiments of the present invention relate to a Long Term Evolution (LTE)-Advanced system, which is next-generation mobile communication being standardized by the 3rd Generation Partnership Project (3GPP), and more particularly, to a channel management method according to a radio channel state and a channel management method of efficiently performing retransmission (hybrid automatic repeat request (HARQ)) and discontinuous reception (DRX) control of a terminal in a structure in which communication between a base station and the terminal is performed using a plurality of carriers.

2. Related Art

3GPP, which is a mobile communication standardization organization, has developed an LTE system standard as a next-generation mobile communication standard. Also, the development of the LTE-Advanced system standard as an extension of an LTE standard is under way to satisfy International Mobile Telecommunication (IMT)-Advanced system requirements proposed by International Telecommunication Union-Radio communication Sector (ITU-R).

While the LTE standard supports a maximum radio bandwidth of 20 MHz for mobile communication, the LTE-Advanced standard uses bandwidth aggregation (carrier aggregation) technology to support a maximum bandwidth of 100 MHz. Thus, in the LTE-Advanced standard, the bandwidth of 100 MHz is divided into component carriers (CCs), each of which has a maximum bandwidth of 20 MHz, and a base station may communicate with a terminal by simultaneously using a plurality of carriers.

The terminal, which supports multicarrier communication, uses a plurality of radio channels in a broadband. The wider a frequency bandwidth for use in communication, the higher power consumption. Therefore, the terminal of the LTE-Advanced system activates and uses multiple carriers only when traffic is large, and performs communication using only a single carrier when traffic is small.

FIG. 1 is a conceptual diagram illustrating a general procedure in which a base station configures and activates carriers for a terminal in a multicarrier environment.

Referring to FIG. 1, the LTE-Advanced system controls a configuration procedure 110, an activation procedure 120, and a deactivation procedure 130 into which a multicarrier management step is divided. Although a maximum of five CCs may currently exist in the LTE-Advanced standard, an example in which three CCs (downlink (DL) CC #1 141, DL CC #2 142, and DL CC #3 143) are used as DL CCs is shown in FIG. 1.

When the terminal is connected to the base station that provides multicarrier communication, a multicarrier communication environment is constructed using the configuration procedure. The base station transmits a configuration message to cause the terminal to store configuration information regarding multicarrier communication and prepare carrier communication.

When traffic is low, the terminal communicates with the base station by use of only single carriers (DL CC #1 of FIG. 1 and uplink (UL) CC #1 (not shown)). In a state in which the single carrier is used, the used carrier is referred to as a primary carrier or a primary cell. A radio channel state of the primary carrier is measured in a short cycle and managed as a state in which stable communication is possible.

When traffic of the terminal increases, the base station uses the activation procedure to cause the terminal to actually use a plurality of CCs. A carrier to be activated for the multicarrier environment is referred to as a secondary carrier or a secondary cell of which a radio channel state is managed at a lower level than that of the primary carrier.

The term "carrier" used in the LTE-Advanced system refers to a medium for transmitting a radio channel in a specific frequency band for wireless communication by the base station, and hence has the same meaning as a mobile communication cell. In other words, the terminal of the present invention may perform communication by simultaneously receiving radio channels transmitted in a plurality of cells.

In order to activate the secondary carrier, the base station transmits an activation message to the terminal. Upon receipt of the message, the terminal activates the secondary carrier and uses the activated secondary carrier in communication.

Accordingly, a large volume of data is transmitted and received by multiple carriers, and a data transmission rate is increased. If traffic with the terminal is decreased, the base station transmits a deactivation message to cause the terminal to use only a single carrier. DL and UL CCs may be independently configured/released and activated/deactivated. Also, the DL and UL CCs may be simultaneously activated/deactivated by one message.

When multicarrier communication is performed, data is mapped and transmitted according to each CC. A scheduler of the base station divides data to be transmitted in units of CCs, and the divided data is allocated and transmitted according to each CC. Transmitted data is retransmitted using the same CC.

Under an assumption of FIG. 1, one data block is assigned to DL CC #1. If a data reception error occurs after initial transmission, retransmission (or HARQ) should be performed using DL CC #1. When DL data is transmitted, the data is allocated to a data channel (that is, a physical downlink shared channel (PDSCH)), and demodulation information about the data channel is indicated and transmitted on a control channel (that is, a physical downlink control channel (PDCCH)).

The control channel may be transmitted by the same CC as the data channel or a different CC. If CC positions are different from each other, a position of the data channel is indicated using a carrier indicator (or a carrier indicator field (CIF)) within the control channel.

If traffic between the base station and the terminal increases and a radio channel state of some CCs becomes bad in a state in which multiple carriers are used, the number of data reception errors of a receiver increases and the number of retransmissions increases. In particular, if a radio channel state of a CC becomes bad in a structure in which retransmission is performed by only the CC used during initial transmission as in the LTE-Advanced system, there is a problem in that the number of reception errors rapidly increases.

Also, there is a problem in that data transmitted once is retransmitted until reception succeeds during a maximum number of retransmissions, regardless of a radio channel state. This procedure leads to unnecessary retransmission operations and power consumption of the terminal. Further, there is a problem in that the waste of radio resources and the degradation of base station performance occur because other terminals may not use resources due to unnecessary retransmission.

FIG. 2 is a conceptual diagram illustrating a power consumption reduction (DRX) operation of the terminal in a mobile communication system.

Referring to FIG. 2, the terminal is controlled in a period divided into an on-duration period 201 in which an operation of receiving a DL control channel transmitted from the base station is performed and a sleep period 202 in which an operation of stopping a reception operation and reducing power consumption is performed.

If the base station does not transmit a control channel to the terminal in an on-duration mode, the terminal is switched to a sleep mode by determining that it is not necessary to receive data. If the control channel is received in the on-duration mode, a wakeup state is maintained for a predetermined time by use of an inactivity timer. A cycle in which the terminal performs an on-duration operation is indicated as a DRX cycle 203. The DRX cycle is divided into long DRX and short DRX. In the long DRX, it is possible to minimize power consumption because a data reception cycle of the terminal is long.

In the mobile communication system of the multicarrier structure, all carriers use the same DRX operation procedure. All activated carriers perform the on-duration operation when one carrier is in the on-duration mode, and also the sleep state is equally applied to all carriers.

In order to maintain the DRX operation of each carrier, a DRX-related timer is managed according to each carrier. If one carrier performs a DL control channel reception operation by the timer, all carriers are put in a wakeup mode, thereby performing the same wakeup operation.

On the other hand, a secondary-carrier deactivation procedure and a DRX procedure should be stably controlled so that states managed by the base station and the terminal are consistent with each other if the secondary carrier is configured and operated in the multicarrier environment. When the deactivation procedure is performed, a HARQ retransmission procedure to be performed by the terminal should be managed according to a deactivation state.

SUMMARY

Accordingly, example embodiments of the present invention are provided to substantially obviate one or more problems due to limitations and disadvantages of the related art.

A first object of the present invention is to provide a DL channel management method of a base station in a carrier aggregation environment in which the base station can stop data transmission by a DL CC of a bad radio channel state.

A second object of the present invention is to provide a UL channel management method of a base station in a carrier aggregation environment in which the base station instructs a terminal to stop data transmission by a UL CC of a bad radio channel state.

A third object of the present invention is to provide a UL channel management method of a terminal in a carrier aggregation environment in which the terminal stops use of a UL CC by receiving an instruction for stopping data transmission by the UL CC of a bad radio channel state from a base station.

A fourth object of the present invention is to provide a channel management method in a carrier aggregation environment which stably controls a secondary-carrier deactivation procedure to prevent carrier states managed by a base station and a terminal from being inconsistent with each other when a secondary carrier is configured and operated in a multicarrier environment.

According to an example embodiment of the present invention for accomplishing the first object, there is provided a DL channel management method in a carrier aggregation environment, including: determining, by a base station, a DL CC of an unstable radio channel state; and stopping data transmission by the determined DL CC of the unstable radio channel state.

In the DL channel management method, the determining may include: determining the DL CC of the unstable radio channel state on the basis of channel state information (CSI) received from a terminal connected to the base station, or determining that the DL CC is in the unstable radio channel state if information regarding reception failure (NACK) of data transmitted by the DL CC is received from the terminal a predetermined number of times or more or if reception success information (ACK) or the reception failure information (NACK) is not received from the terminal a predetermined number of times or more.

In the DL channel management method, the stopping may include notifying the terminal connected to the base station of stop of data transmission by the DL CC of the unstable radio channel state, and the notifying may include providing data transmission stop notification using a DL control channel (PDCCH) or a DL data channel (PDSCH).

In the DL channel management method, the stopping may include notifying the terminal connected to the base station of stop of data transmission by the DL CC of the unstable radio channel state, and the notifying may further include indicating new data transmission, not previous-data retransmission, in a DL control channel.

In the DL channel management method, the stopping may include: notifying the terminal connected to the base station of stop of data transmission by the DL CC of the unstable radio channel state, and the notifying may include using a CC deactivation message.

According to an example embodiment of the present invention for accomplishing the second object, there is provided a UL channel management method in a carrier aggregation environment, including: determining, by a base station, a UL CC of an unstable radio channel state among multiple carriers; and instructing a terminal to stop data transmission by the determined UL CC of the unstable radio channel state.

In the UL channel management method, the determining may include: determining that the UL CC is in the unstable radio channel state if a channel state value of the UL CC is equal to or less than a reference value for a predetermined time by use of radio CSI collected by the base station or if a reception error of data received by the UL CC from the terminal occurs a predetermined number of times or more.

In the UL channel management method, the instructing may include instructing, by the base station, the terminal to stop the data transmission by use of a CC deactivation message.

According to an example embodiment of the present invention for accomplishing the third object, there is provided a UL channel management method in a carrier aggregation environment, including: receiving, by a terminal, an instruction for stopping data transmission by a UL CC of an unstable radio channel state from a base station; and stopping data retransmission by the UL CC and initializing a retransmission buffer of the CC when the data transmission stop instruction is received.

In the UL channel management method, the receiving may include receiving a CC deactivation message for the UL CC of the unstable radio channel state from the base station.

At this time, the UL channel management method may further include performing a procedure of deactivating the UL CC of the unstable radio channel state when the data transmission stop instruction is received through the CC deactivation message.

According to an example embodiment of the present invention for accomplishing the fourth object, there is provided a channel management method of a base station in a carrier aggregation environment, including: transmitting, by the base station, a deactivation message for a secondary carrier to a terminal; receiving a reception success message with regard to the deactivation message from the terminal; and changing the secondary carrier to a deactivation state a predetermined time after the reception success message arrives.

The channel management method may further include stopping, by the base station, data transmission and retransmission by the secondary carrier immediately after the transmitting.

In the channel management method, the predetermined time may have a value predefined to make a point in time when the terminal transmitting the reception success message changes the secondary carrier to the deactivation state consistent with a point in time when the base station changes the secondary carrier to the deactivation state.

According to another example embodiment of the present invention for accomplishing the fourth object, there is provided a channel management method of a terminal in a carrier aggregation environment, including: receiving a deactivation message for a secondary carrier from a base station; transmitting a reception success message with regard to the deactivation message to the base station; and changing the secondary carrier to a deactivation state a predetermined time after the reception success message is transmitted.

The channel management method may further include stopping, by the terminal, data transmission and retransmission by the secondary carrier immediately after the receiving.

In the channel management method, the predetermined time may have a value predefined to make a point in time when the terminal transmitting the reception success message changes the secondary carrier to the deactivation state consistent with a point in time when the base station changes the secondary carrier to the deactivation state.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
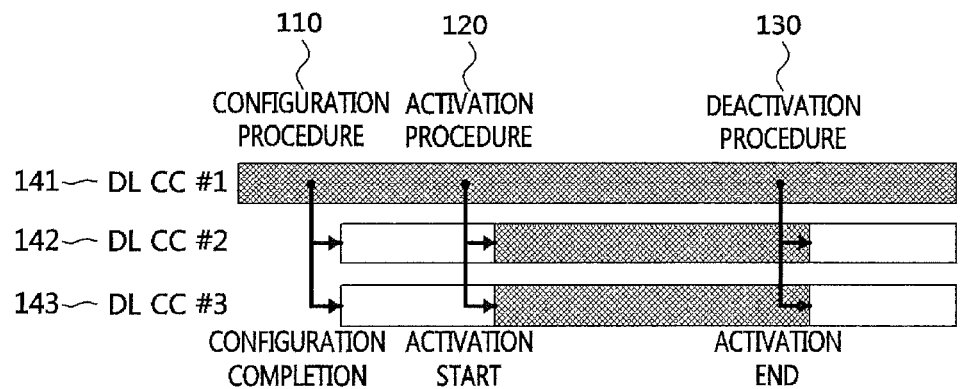
FIG. 1 is a conceptual diagram illustrating a general procedure in which a base station configures and activates carriers for a terminal in a multicarrier environment.
Figure 2:
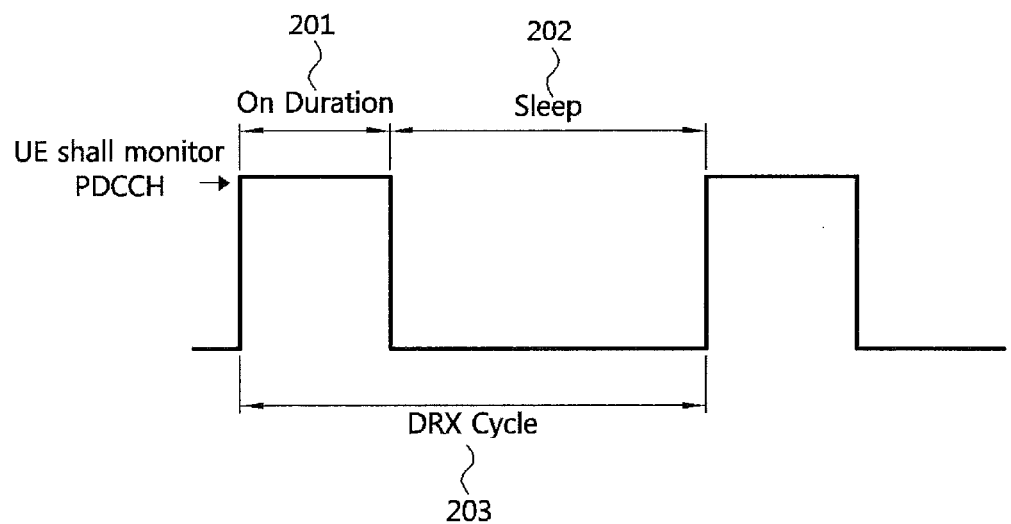
FIG. 2 is a conceptual diagram illustrating a power consumption reduction (DRX) operation of the terminal in a mobile communication system.

While the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" may refer to a mobile station (MS), user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, and also portable units or terminals having a combination of such functions, but the present invention is not limited thereto.

The term "base station" used herein generally denotes a fixed or moving point communicating with a terminal, and may be referred to as a Node-B, evolved Node-B (eNB), base transceiver system (BTS), access point, relay, femto-cell, and other terms. In the present invention, the terminal "base station" is used to mean a control device that controls one cell. In an actual communication system, a "physical base station" may control a plurality of cells. In this case, the physical base station may include a plurality of base stations in the present invention. That is, when different parameters are allocated to respective cells, respective base stations may allocate different values.

The term "carrier" used in the present invention refers to a medium for transmitting a radio channel in a specific frequency band for wireless communication by the base station, and hence has the same meaning as a mobile communication cell. In other words, the terminal of the present invention may perform communication by receiving radio channels transmitted in a plurality of cells.

With reference to the appended drawings, exemplary embodiments of the present invention will be described in detail below. To aid in understanding the present invention, like numbers refer to like elements throughout the description of the figures, and the description of the same component will not be reiterated.

DL Channel Management Method According to Example Embodiment of Present Invention In a mobile communication system based on frequency division duplexing (FDD), a terminal measures a DL radio channel state, and transmits measured CSI to a base station. At this time, the base station manages the radio channel state of a carrier by analyzing the received DL CSI and uses the CSI as information for scheduling.

In a mobile communication system based on time division duplexing (TDD), the base station may recognize a DL radio channel state to manage the radio channel state by analyzing a UL radio channel state because the same frequency band is used in UL and DL.

Figure 3:
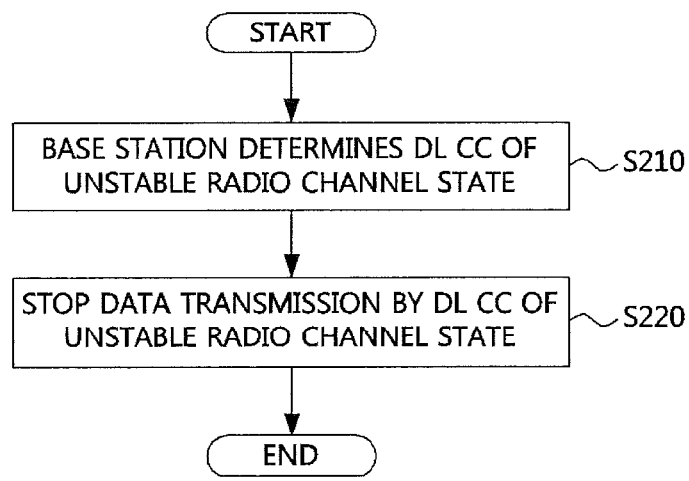
FIG. 3 is a flowchart illustrating a DL channel management method according to an example embodiment of the present invention.

FIG. 3 is a flowchart illustrating a DL channel management method according to an example embodiment of the present invention.

According to the example embodiment of the present invention, the DL channel management method may be configured as a DL channel management method in a carrier aggregation environment so that the base station determines a DL CC of an unstable radio channel state among multiple carriers and stops data transmission by the CC.

Referring to FIG. 3, the DL channel management method according to the example embodiment of the present invention may include step S210 of determining, by the base station, a DL CC of an unstable radio channel state and step S220 of stopping data transmission by the DL CC of the unstable radio channel state determined in step S210.

First, in step S210, the determination of the radio channel state may be made on the basis of radio CSI received from the terminal, or the base station may directly measure and determine the radio channel state. For example, the determination may be made on the basis of whether a channel state value recognized from the received CSI is equal to or less than a predetermined threshold reference value for a predetermined time.

If data reception success information is not received from the terminal a predetermined number of times or more in step S210, the base station may determine that a radio channel state of a carrier is unstable. Cases where the base station does not receive the data reception success information occur when the base station receives reception failure information (NACK) or does not receive reception success information (ACK) or reception failure information (NACK) during a designated reception period (a case where reception fails).

Next, if it is determined that a DL CC is in an unstable radio channel state in step S210, step S220 of stopping data transmission by the DL CC of the unstable radio channel state is performed.

In step S220, the base station stops data allocation to the DL CC. In step S220, the base station may perform the step of transmitting a notification message for stopping retransmission by the DL CC to the terminal through another DL CC.

A carrier for use in the message transmission may be a primary carrier or a secondary carrier of a good radio channel state, and a position of the carrier for use in the message transmission may be indicated using a CIF.

Figure 4:
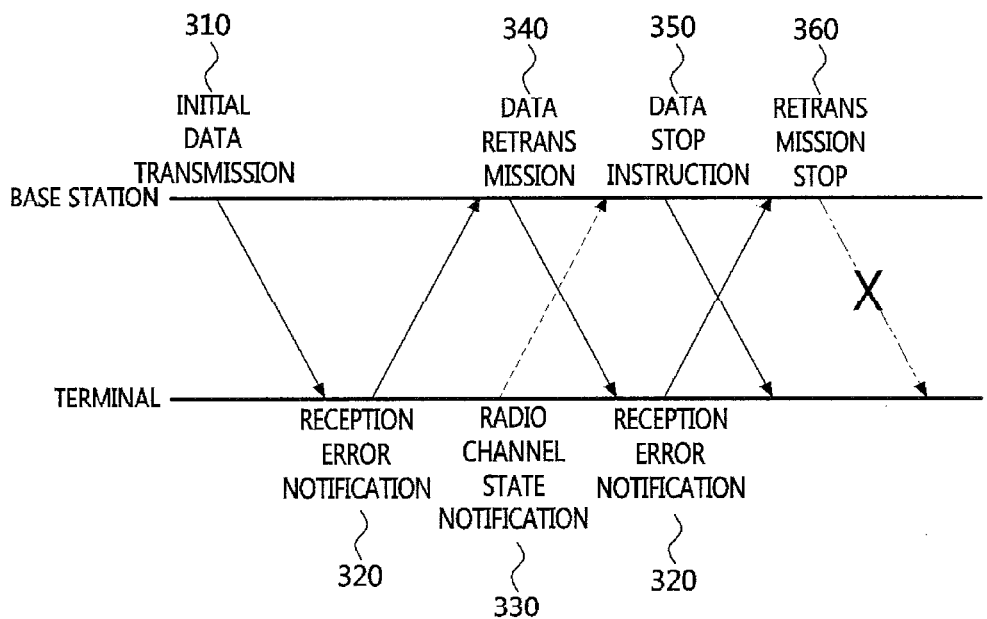
FIG. 4 is a conceptual diagram illustrating a DL data retransmission stop procedure in a multicarrier environment according to an example embodiment of the present invention.

FIG. 4 is a conceptual diagram illustrating a DL data retransmission stop procedure in a multicarrier environment according to an example embodiment of the present invention.

In general, a data transmission procedure between the base station and the terminal is accomplished by iterating initial data transmission 310, the terminal's reception error notification 320, radio channel state notification 330, and the base station's data retransmission 340.

In the above-described DL channel management method according to the example embodiment of the present invention, the base station determines whether a radio channel state of some DL CCs is bad on the basis of radio channel state notification 330 or reception error notification 320 of multiple carriers received from the terminal and non-reception of reception error notification, notifies the terminal of stop of data transmission by a CC of a bad radio channel state (350), and stops the data transmission by the CC (360). Of course, the data transmission stop notification 350 and the data transmission stop 360 may be performed in reverse order.

Thus, if a transmission stop instruction is received, the terminal stops the reception error notification or retransmission procedure.

Here, the base station may transmit retransmission stop information to the terminal using a control channel, a data channel, and the like. Four methods will be described in detail below.

1) Method Using Control Channel (PDCCH)

A carrier retransmission stop indication is included in the control channel and transmitted to the terminal, and an indication method may use some fields of the control channel (for example, a transport block (TB) field).

At this time, information regarding a carrier of which retransmission will be stopped may be indicated using a carrier identifier (or CIF) in the control channel Information regarding data of which transmission will be stopped may be indicated by a retransmission-related field (for example, a new data indicator (NDI) field or a redundancy version (RV) field) or a discriminable value, so that the stop of all data transmissions by the carrier is indicated.

2) Method Using Data Channel (PDSCH)

A carrier retransmission stop indication is included in the data channel and transmitted to the terminal. An information indication method may be configured to provide retransmission stop notification by defining a predetermined field as in the method using the control channel.

The above-described control information may be configured by a new control message (or medium access control (MAC) control element).

3) Method Using Existing Method

An indication of new data transmission, not previous-data retransmission, is included in the control channel (for example, new data transmission is indicated by changing (or toggling) the NDI field of PDCCH), and resource consumption may be avoided by minimizing and allocating a size of the data channel (or the TB field) to be allocated.

At this time, meaningless data (or padding) may be transmitted on the data channel so as to avoid data transmission delay using an unstable channel Otherwise, it is possible to transmit retransmission stop control information described above.

4) Method Using CC Deactivation Message

Using an existing carrier deactivation message, the base station transmits a deactivation message for a DL CC to the terminal. If the deactivation message is received, the terminal performs a procedure of deactivating the DL CC and simultaneously the base station may stop all transmission (initial transmission and retransmission) by the DL CC.

In the meantime, the terminal receiving the data transmission stop notification using the above-described method may notify the base station that a stop message has been successfully received.

In the present invention, if the terminal is notified of retransmission stop information, the terminal may stop a data retransmission procedure by terminating a control channel reception operation for retransmission data reception by a designated carrier. A demodulation operation error of retransmission is prevented by initializing a reception buffer of the carrier or a retransmission block.

If a retransmission procedure of a carrier is stopped, an operation (DRX) for reducing power consumption or a carrier deactivation procedure may be performed. In further detail, the terminal demodulates a control channel for a predetermined time so as to receive data in which a reception error has occurred, and thus cannot perform the DRX operation. However, if the procedure of the present invention is used, the terminal may immediately stop the control channel demodulation operation and perform the DRX operation.

In the method of the related art, data initially transmitted by a specific DL CC is iteratively retransmitted by a CC up to a preset maximum number of times (for example, 8 times) even when a radio channel state is unstable. However, in the DL channel management method according to the example embodiment of the present invention, it is possible to reduce power consumption of the terminal, the waste of radio resources due to unnecessary retransmissions, and the degradation of base station performance by preventing an unnecessary retransmission operation for the terminal in an unstable radio channel state.

UL Channel Management Method according to Example Embodiment of Present Invention The base station measures a UL radio channel state, manages a radio channel state of a received carrier, and uses it as UL scheduling information. UL scheduling is performed by the base station. The base station transmits UL carrier information, information regarding a transmission data size, and the like to be used by the terminal determined by scheduling to the terminal through a control channel (PDCCH).

As a UL channel management method in a carrier aggregation environment, the UL channel management method according to the example embodiment of the present invention may be configured so that the base station determines a UL CC of an unstable radio channel state among multiple carriers and instructs the terminal to stop data transmission by the UL CC. At this time, if the instruction for stopping data transmission by the UL CC of the unstable radio channel state is received from the base station, the terminal may stop data retransmission by the UL CC and initialize a retransmission buffer of the designated UL CC.

Figure 5:
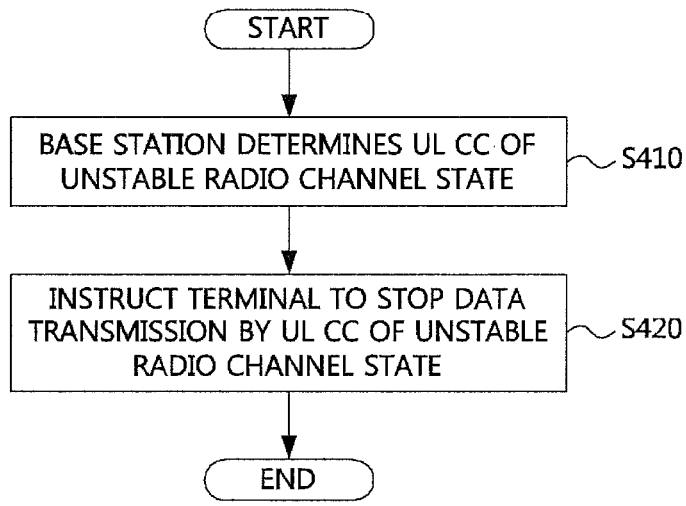
FIG. 5 is a flowchart illustrating a UL channel management method of a base station according to an example embodiment of the present invention.
Figure 6:
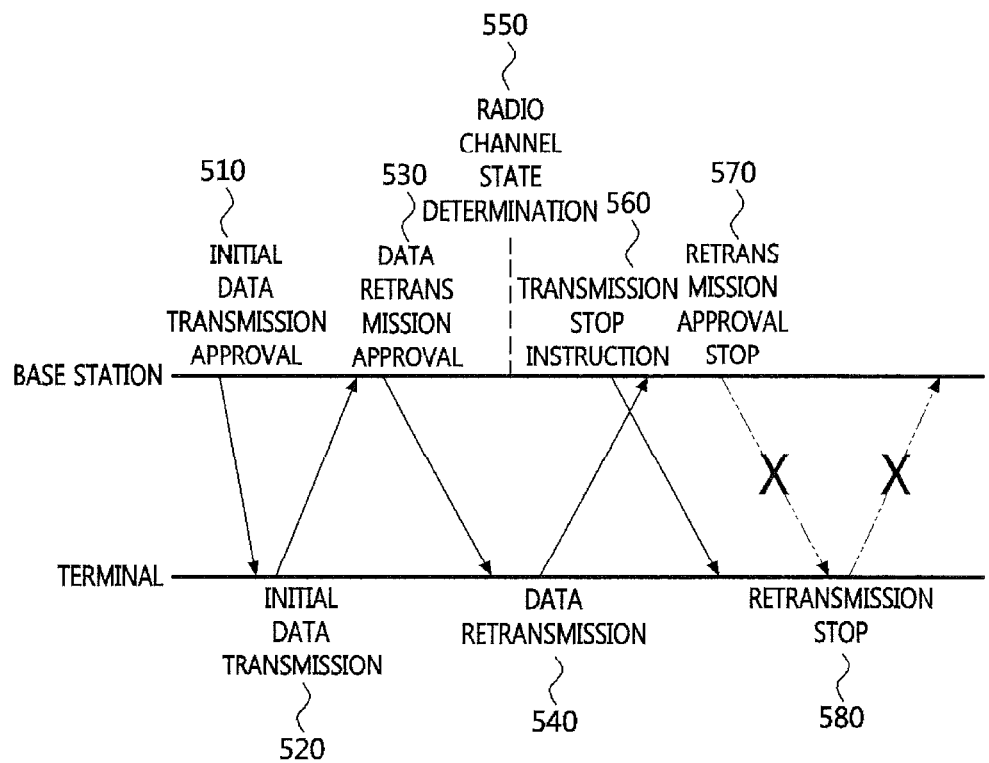
FIG. 6 is a conceptual diagram illustrating a UL data retransmission stop procedure in the multicarrier environment according to an example embodiment of the present invention.
Figure 7:
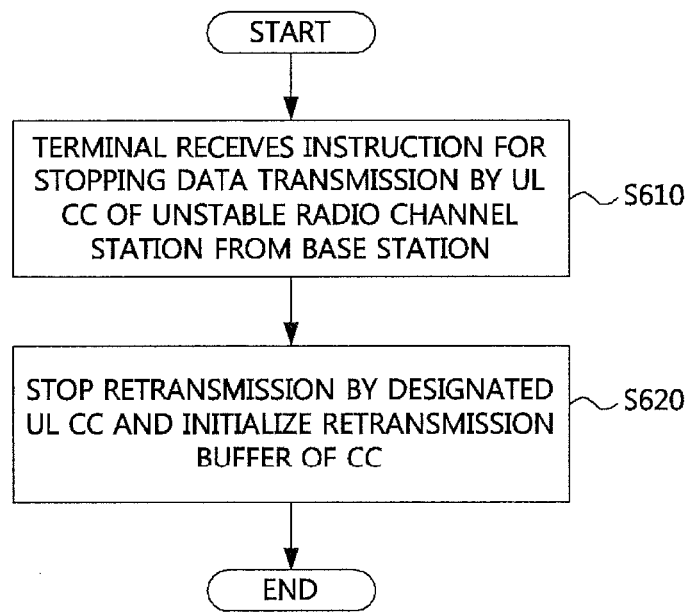
FIG. 7 is a flowchart illustrating a UL channel management method of a terminal according to an example embodiment of the present invention.

UL channel management methods according to example embodiments of the present invention will be described below separately on the side of the base station and the side of the terminal FIG. 5 illustrates the UL channel management method of the base station according to the example embodiment of the present invention, and FIG. 7 illustrates the UL channel management method of the terminal according to the example embodiment of the present invention. FIG. 6 is a conceptual diagram illustrating a UL data retransmission stop procedure in the multicarrier environment according to an example embodiment of the present invention, and is referred to in FIGS. 5 and 7.

FIG. 5 is a flowchart illustrating the UL channel management method of the base station according to the example embodiment of the present invention.

Referring to FIG. 5, the UL channel management method of the base station according to the example embodiment of the present invention may include step S410 of determining, by the base station, a UL CC of an unstable radio channel state among multiple carriers and step S420 of instructing the terminal to stop data transmission by the UL CC of the unstable radio channel state determined in step S410.

First, in step S410, the determination of the radio channel state may be made by determining whether a channel state value of the UL CC is equal to or less than a reference value for a predetermined time by use of radio CSI collected by the base station or determining whether the number of reception errors of UL data received by the UL CC from the terminal is equal to or greater than a reference value for a predetermined time.

Next, in step S420, the base station may instruct the terminal to stop data transmission using a control channel, a data channel, and the like. Four methods will be described in detail below.

1) Method Using Control Channel (PDCCH)

A data transmission stop indication is included in the control channel and transmitted to the terminal, and an indication method may use some fields of the control channel (for example, a TB field).

At this time, a UL CC of which retransmission will be stopped may be indicated using a carrier identifier (or CIF) in the control channel.

Information regarding data of which transmission is stopped may be indicated by a retransmission-related field (for example, an NDI field or an RV field) or a discriminable value, so that the stop of all data transmissions by the UL CC is indicated.

2) Method Using Data Channel (PDSCH)

A UL CC retransmission stop indication is included in the data channel and transmitted to the terminal. An information indication method may be configured to provide retransmission stop notification by defining a predetermined field as in the method using the control channel.

The above-described control information may be configured by a new control message (or MAC control element).

3) Method Using Existing Method

An indication of new data transmission, not previous-data retransmission, is included in the control channel (for example, new data transmission is indicated by changing (or toggling) the NDI field of PDCCH), and resource consumption may be avoided when the terminal transmits UL data by minimizing and allocating a size of the data channel (or the TB field) to be allocated.

At this time, the terminal may transmit meaningless data (or padding) on the data channel so as to avoid data transmission delay using an unstable channel.

4) Method Using CC Deactivation Message

If the base station instructs the terminal to stop data retransmission using a carrier deactivation message, and the terminal receives the carrier deactivation message from the base station, the terminal may perform a procedure of deactivating the corresponding carrier, and, simultaneously (or before/after the deactivation procedure), stop all transmission (initial transmission and retransmission) by the carrier.

FIG. 6 is a conceptual diagram illustrating a UL data retransmission stop procedure in the multicarrier environment according to an example embodiment of the present invention.

In general, a data transmission procedure between the base station and the terminal is accomplished by iterating the base station's initial transmission approval, the terminal's initial data transmission, the base station's data retransmission approval, and the terminal's retransmission.

However, in the UL channel management method according to the example embodiment of the present invention, the base station determines a radio channel state (550), and makes a transmission stop instruction 560 for stopping transmission by a UL CC if the radio channel state of the UL CC is bad. Thus, the base station stops an approval of retransmission by the carrier (570), and the terminal stops a retransmission procedure when receiving the transmission stop instruction (580).

FIG. 7 is a flowchart illustrating the UL channel management method of the terminal according to the example embodiment of the present invention.

Referring to FIG. 7, the UL channel management method of the terminal according to the example embodiment of the present invention may include step S610 in which the terminal receives an instruction for stopping data transmission by a UL CC of an unstable radio channel state from the base station and step S620 of stopping data retransmission by the designated UL CC and initializing a retransmission buffer of the designated UL CC when the data transmission stop instruction is received.

First, because step S610 in which the terminal receives the data transmission stop instruction for stopping the data transmission by the UL CC of the unstable radio channel state from the base station may be configured in connection with the method for the data transmission stop instruction transmitted from the base station in step S410 of FIG. 5, redundant description thereof is omitted.

Next, in step S620, the terminal may stop the data retransmission by the UL CC and initialize the retransmission buffer of the designated UL CC when receiving the instruction for stopping the data transmission by the designated UL CC of the unstable radio channel state.

That is, in step S620, the terminal prevents a modulation operation error related to retransmission by stopping the data retransmission by the designated UL CC and initializing the UL CC or the retransmission buffer. If retransmission by the carrier is stopped, an operation (DRX) for reducing power consumption or a carrier deactivation procedure may be performed.

In the method of the related art, data initially transmitted by a specific UL CC is iteratively retransmitted by the CC up to a preset maximum number of times (for example, 8 times) even when a radio channel state is unstable. In particular, there is a problem in that the terminal continuously performs retransmission even when the base station does not approve the retransmission in UL differently from DL as described above. In further detail, there is a problem in that the terminal retransmits data by a carrier by determining that a reception error has occurred if a predetermined time has elapsed even when a data retransmission instruction is not received from the base station through a control channel after data transmission.

However, in the UL channel management method according to the example embodiment of the present invention, it is possible to reduce power consumption of the terminal, the waste of radio resources due to unnecessary retransmissions, and the degradation of base station performance by preventing an unnecessary retransmission operation when a radio channel state is unstable.

In the above-described DL and UL channel management methods, a deactivation message may be used to signal a data transmission stop instruction and a secondary carrier used in communication may be deactivated by the deactivation message. At this time, if the secondary carrier used in communication is deactivated, the terminal initializes a buffer used for data retransmission by the secondary carrier. A detailed deactivation procedure will be described below.

When use of the secondary carrier is stopped, the base station transmits a secondary-carrier deactivation message to the terminal. Secondary-carrier deactivation includes UL and DL deactivations. If the deactivation message is received, the terminal changes the secondary carrier to a deactivation state. According to an example embodiment of the present invention, a deactivation state change of the terminal includes the following.

- A demodulation procedure of the corresponding DL secondary carrier is stopped.
- Data transmission using the corresponding UL secondary carrier is stopped.
- A DL retransmission buffer of the secondary carrier is initialized and a retransmission procedure is stopped.
- A UL retransmission buffer of the secondary carrier is initialized and a retransmission procedure is stopped.

When the deactivation message has been transmitted, the base station operates to maintain the same state as the terminal so as to support the deactivation state of the terminal. For this, DL channel transmission by the secondary carrier is stopped and the UL and DL retransmission buffers are initialized.

Method of Preventing Carrier States of Base Station and Terminal from Being Inconsistent When the base station has transmitted the deactivation message, the terminal has a time delay for message reception and demodulation so as to perform a state change procedure, so that the following procedure may be used to solve time inconsistency between the base station and the terminal.

The base station stops data transmission and retransmission by a secondary carrier immediately after transmitting the deactivation message. A predetermined time after a reception success message with regard to the deactivation message is received from the terminal, the secondary carrier is changed to a deactivation state.

If the terminal successfully receives (demodulates) the deactivation message, data transmission by the secondary carrier is stopped. The secondary carrier is changed to the deactivation state a predetermined time after a data reception success message is transmitted to the base station, and a time to change the secondary carrier to the deactivation state is consistent between the base station and the terminal.

In the meantime, even when the deactivation message is not used and communication is not performed by the secondary carrier used between the base station and the terminal for a predetermined time, the base station and the terminal change the secondary carrier to the deactivation state. A deactivation state change procedure is the same as described above.

Details of Secondary-Carrier Deactivation Procedure According to Example Embodiment of Present Invention In the example embodiment of the present invention, the terminal stops a power consumption reduction operation (DRX) for a secondary carrier when the secondary carrier is used by the terminal is deactivated. A detailed procedure will be described below.

In the mobile communication system of the multicarrier structure, the power consumption operation of the terminal is performed in parallel to control a plurality of carriers. Thus, the terminal controls a DRX operation according to each of multiple carriers, and particularly, a timer related to HARQ retransmission control is managed in each HARQ process unit.

More specifically, the HARQ retransmission procedure is performed in secondary-carrier units. If initial transmission fails, the retransmission is performed through the same secondary carrier. If data transmission fails, the terminal manages a DRX-retransmission timer and a HARQ round trip time (RTT) timer according to each HARQ process. Thus, if the data transmission fails, the HARQ RTT timer is set to 8 for a data block of which transmission fails, and the DRX-retransmission timer is set to a predetermined value. After the terminal is in a sleep mode during 8 subframes according to the set value, the HARQ RTT timer is terminated, and retransmission data is received by starting the DRX-retransmission timer to wake up.

However, when the secondary carrier is deactivated and it is not necessary to perform retransmission, a wakeup operation for a retransmission procedure is not performed by initializing the HARQ RTT timer and the DRX-retransmission timer.

Figure 8:
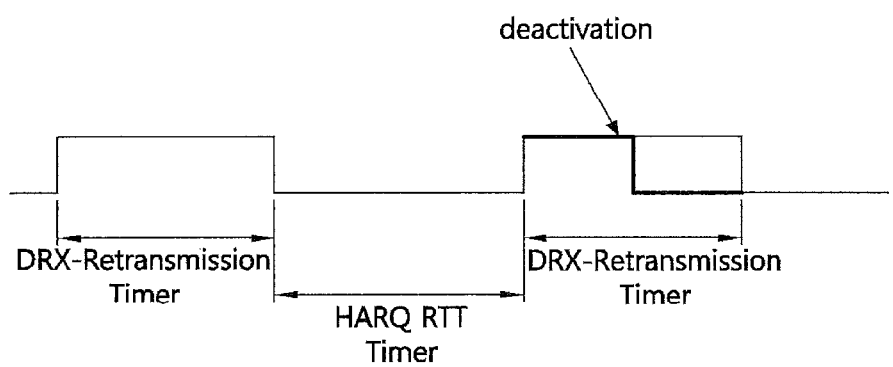
FIG. 8 is a diagram illustrating a secondary-carrier deactivation procedure according to an example embodiment of the present invention.

FIG. 8 is a diagram illustrating a secondary-carrier deactivation procedure according to an example embodiment of the present invention.

As shown in FIG. 8, secondary-carrier retransmission is iterated and the DRX-retransmission timer and the HARQ RTT timer are in operation. At this time, if the deactivation message is received, the terminal terminates the operation of the DRX-retransmission timer and stops an unnecessary wakeup state.

In an example embodiment of the present invention, when the secondary carrier is in operation in an on-duration state or is maintained in the wakeup state by an inactivity timer, the terminal immediately stops the on-duration state or the inactivity timer and stops the wakeup operation if a deactivation message of the corresponding secondary carrier is received from the base station.

While the example embodiments of the present invention and their advantages have been described in detail, it should be understood that various changes, substitutions and alterations may be made herein without departing from the scope of the invention.

What is claimed is:

1. A method of controlling activation and deactivation of a secondary cell performed by a user equipment (UE) in a multiple component carrier system, the method comprising:
configuring a secondary cell in the UE;
receiving, from a base station (BS), an activation message indicating activation or deactivation of the secondary cell configured in the UE; and
performing an activation procedure or a deactivation procedure for the secondary cell configured in the UE based on the indication of the activation message,
wherein the deactivation procedure is performed on the secondary cell after a predetermined time,
wherein the deactivation procedure is performed either at the time when the activation message indicating deactivation is received, or before a second time from when the first time is expired, and
wherein the method further comprising:
initializing a retransmission buffer regarding the secondary cell before the second time is expired.

2. The method of claim 1, wherein the deactivation procedure includes at least one of uplink transmission stop and the end of control channel reception in the at least one secondary cell.

3. The method of claim 1, wherein the activation message consists of a medium access control (MAC) control element.

4. A user equipment (UE) controlling activation and deactivation of a secondary cell in a multiple component carrier system, wherein the UE performs:
configuring a secondary cell in the UE;
receiving, from a base station (BS), an activation message indicating activation or deactivation of the secondary cell configured in the UE; and
performing an activation procedure or a deactivation procedure for the at least one secondary cell configured in the UE based on the indication of the activation message,
wherein the UE performs the deactivation procedure if the UE does not perform any communication toward the BS during a first time in the secondary cell,
wherein the UE performs the deactivation procedure either at the time when the activation message indicating deactivation is received, or before a second time from when the first time is expired, and
wherein the UE initializes a retransmission buffer regarding the at least one secondary cell before the second time is expired.

5. The UE of claim 4, wherein the deactivation procedure includes at least one of uplink transmission stop and the end of control channel reception in the at least one secondary cell.

6. The UE of claim 4, wherein the activation message consists of a medium access control (MAC) control element.

* * * * *